United States Patent
Silverstein

(10) Patent No.: US 7,133,148 B2
(45) Date of Patent: Nov. 7, 2006

(54) DIGITAL CAMERA FOR IMAGE DEVICE CALIBRATION

(75) Inventor: D. Amnon Silverstein, Mtn. View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 10/057,586

(22) Filed: Jan. 25, 2002

(65) Prior Publication Data
US 2003/0142374 A1    Jul. 31, 2003

(51) Int. Cl.
*G06F 3/12*     (2006.01)
*G06F 15/00*   (2006.01)
*G06K 1/00*    (2006.01)

(52) U.S. Cl. .............. 358/1.15; 358/406; 358/504; 358/1.9; 341/120; 348/177; 348/178; 348/181; 348/182; 348/189; 348/190

(58) Field of Classification Search ........... 358/1.15, 358/1.2, 1.18, 504, 406; 702/85; 341/120; 250/363.09; 396/578; 348/181, 182, 189, 348/190, 177, 178, 806, 807
See application file for complete search history.

(56) References Cited

U.S. PATENT DOCUMENTS

| | | | |
|---|---|---|---|
| 5,012,163 A | 4/1991 | Alcorn et al. | 315/383 |
| 5,212,546 A | 5/1993 | Arazi et al. | 258/80 |
| 5,381,309 A | 1/1995 | Borchardt | 362/31 |
| 5,381,349 A * | 1/1995 | Winter et al. | 382/167 |
| 5,887,223 A * | 3/1999 | Sakai et al. | 399/60 |
| 5,933,682 A * | 8/1999 | Rushing | 399/51 |
| 5,956,044 A * | 9/1999 | Giorgianni et al. | 345/590 |
| 6,285,349 B1 * | 9/2001 | Smith | 345/690 |
| 6,462,777 B1 * | 10/2002 | Hamaguri | 348/188 |
| 6,850,245 B1 * | 2/2005 | Murashita et al. | 345/589 |

* cited by examiner

*Primary Examiner*—Twyler Lamb
*Assistant Examiner*—Yixing Qin

(57) ABSTRACT

The invention is directed to an apparatus for calibrating an output of an image output device, comprising an image input device configured to image an output of the image output device; and a test pattern generator having an output of a dynamic test patch area and a grating area connected to an input of the image output device and responsive to the image input device for adjusting an intensity level of the dynamic test patch area to match an average intensity level of the grating area.

22 Claims, 2 Drawing Sheets

US 7,133,148 B2

DIGITAL CAMERA FOR IMAGE DEVICE CALIBRATION

TECHNICAL FIELD

The present invention relates to calibration of output devices and specifically calibrating printers and display devices using a digital camera.

BACKGROUND

Continuing advances in computers and digital communications have resulted in the proliferation of digital imagery, such images including, for example, still images, full motion video, graphics incorporated into on-line catalogs, advertisements and web pages. While substantial effort has been expended to ensure that data storage and transmission provides an accurate representation of the original data, fidelity of a rendered image with respect to the original or a desired image has been largely left to the individual user.

Prior techniques to ensure the fidelity of an output device such as a video monitor or color printer accurately represents a desired image relied heavily upon specialized devices such as CRT color analyzers, such as the Minolta CA-100 or the Sencore CPT 288 color analyzer. These devices may be capable of measuring the exact gain or gamma function relating display parameters to actual screen output. Such devices have typically been costly and relegated to manufacturing and other test facilities when the cost is justified. However, consumer and small scale usage has not been adequately addressed. This has become a problem with the ever increasing usage of images and graphics in which image fidelity is increasingly important.

At least one software manufacture includes in their game programs a method to calibrate screen video without a photometer or other equipment, instead using just the naked eye. According to this method, a square area is displayed on the screen and the brightness of the square is adjusted until it is just invisible. From this adjustment, an estimate is made of the black level of the screen and graphics are re-calibrated so that display presentation is optimized. However, this method is subjective and requires substantial user effort and experimentation.

Other approaches to calibrating an output device are described in U.S. Pat. Nos. 5,012,163 and 5,381,309 assigned in common with the present application and incorporated herein by reference in their entireties.

There is a need for a simplified method and an inexpensive apparatus for calibrating color rendition of an output device such as a video monitor or printer to ensure image fidelity and, in particular, maintain accurate and consistent color rendition of images.

SUMMARY OF THE INVENTION

One aspect of the invention is directed to an apparatus for calibrating an output of an image output device and includes an image input device configured to capture the output of the image device. A test pattern generator is configured to provide a test pattern to be generated as the output of the image output device. The test pattern includes a dynamic test patch, and a grating. The test pattern generator is responsive to the image input device for adjusting in an intensity level of the dynamic test patch area to match an average intensity level of the grating area.

DETAILED DESCRIPTION OF THE INVENTION

The invention provides an improved apparatus for a method of analyzing the output of a display device or printer to correct for non-linearities. For example, the invention employs a conventional imaging device such as a video camera together with a calibration grating displayed on a monitor or printed by a printer to create a closed loop control of a dynamic test patch area. The intensity of the dynamic test patch area is adjusted by varying the appropriate control parameters until the color specific light intensity from the patch is equal to the standardized grating area. Repeating this process to obtain multiple points, the invention may be used to map the true output from the device being calibrated to the corresponding input parameters used to provide that output. A correction may then be formulated, preferably in the form of a "gamma" correction. Gamma correction and gamma functions are described in, for example, U.S. Pat. No. 5,812,286 of Lynn issued Sep. 22, 1998 and entitled "Automatic Color Processing To Detect Hue Shift and Incorrect Exposure" and U.S. Pat. No. 5,710,827 of Perumal, Jr., et al., issued Jan. 20, 1998 and entitled "Halftone Dither Cell With Integrated Preferred Color Matching," both assigned to the assignee of the present invention, and both are incorporated herein by reference in their entireties.

Figure 1:
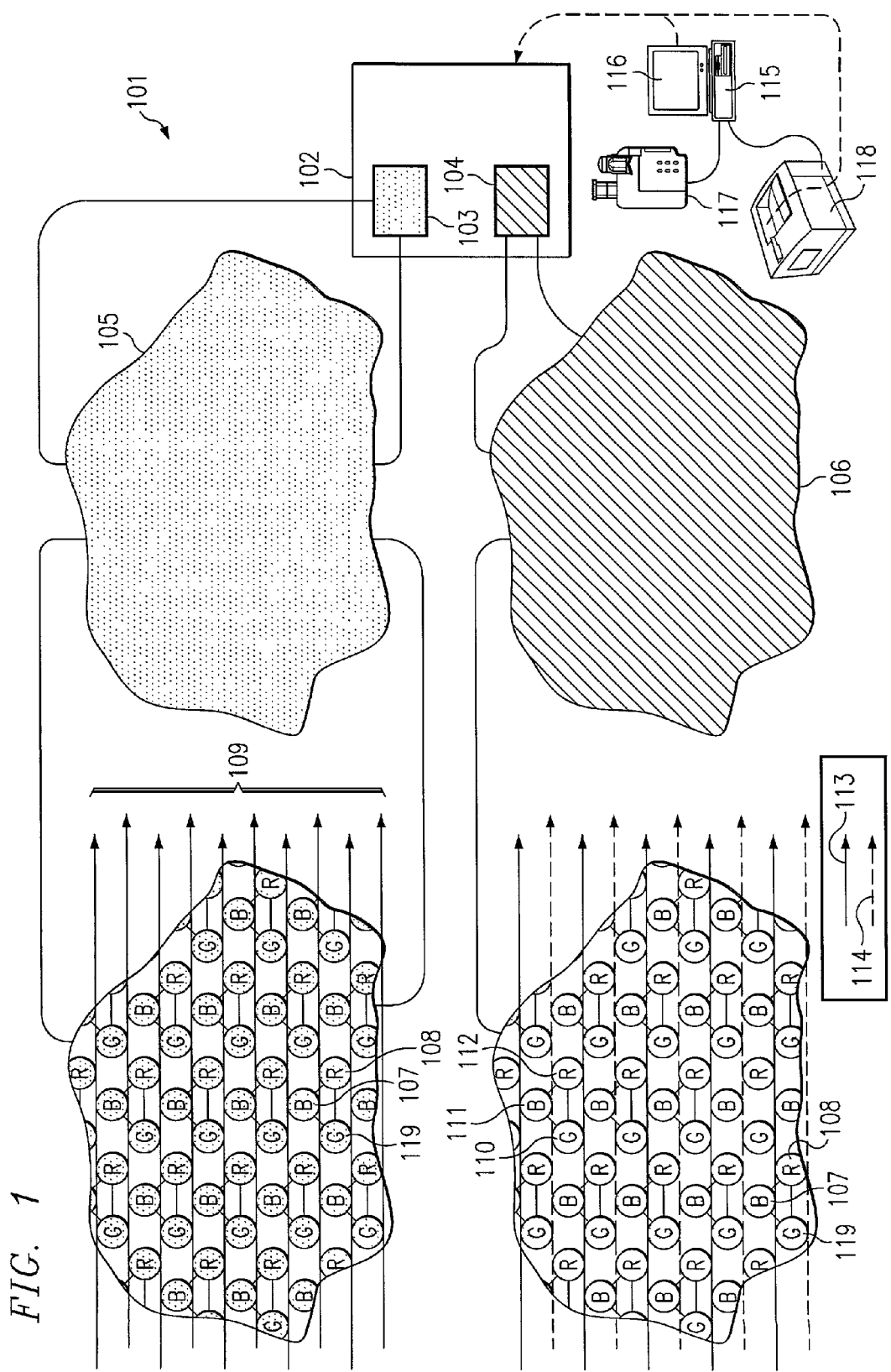
FIG. 1 is a block diagram of a calibration system according to the invention.

Referring to FIG. 1, a preferred embodiment of the invention includes an image input device such as a video camera 117 connected to a test pattern generator platform such as personal computer (PC) 115. While video camera 117 is particularly applicable to providing for the calibration of a video monitor (such as video display 116), other forms of input devices may be used. For example, a paper document scanner may be used when the image output device is in the form of, for example, printer 118. Of course, even in this latter case, video camera 117 may be used to image the printed output of printer 118 as it is used to image the output from video display 116. Video camera 117 may be, for example, a digital camera such as a conference camera already interfaced to PC 115 for conducting video conferences.

PC 115 may be a conventional personal computer running a standard operating system such as Windows 2000, etc. Running under an appropriate operating system, PC 115 is also loaded with and runs a test pattern generator program for generating test patterns 101 for output on either video display 116 or printer 118. Video display 116 may be any video-type display to be calibrated, including, for example, a color CRT (cathode ray tube), LCD (liquid crystal display), or other visual output device. Similarly, printer 118 may be any form of printing device requiring calibration and, particularly, a color printer in which color rendition fidelity may be particularly important.

PC 115 includes appropriate test generator software and hardware to generate an appropriate output signal to an output device to be calibrated such as video display 116 or printer 118. Typically, such output would be in the form of a bit-mapped image or equivalent, in which the image is defined by a plurality of pixels, with each pixel being assigned a value corresponding to a desired intensity level of the output. In the case of a video display, this intensity level may be a luminance level at a corresponding location of a video monitor such as video display 116, or, in the case of a printed output such as printer 118, a desired light reflectance level off of the target media, e.g., the paper. In the case of a color monitor, such as video display 116, the pixel values may include values for each of the primary colors. In a 16 million color system, 8 bits representing 256 values are assigned to each color per pixel. In contrast, using the CMYK (Cyan, Magenta, Yellow and Black) system, 32 bits may be divided among the four colors used in traditional color printing per printed pixel.

Test pattern 101 may be presented in either gray level or full color depending on the output device and correction or calibration to be performed. In either case, test pattern 101 may include three areas, such as a fixed level area 102, dynamic test patch area 103, and grating area 104. Fixed level area 102 constitutes the largest portion of the total area of test pattern 101, its primary function being to minimize or defeat variations caused by automatic gain control (AGC) systems, such as any AGC system incorporated into video camera 117. Preferably, fixed level area 102 constitutes 80–90% or more of the displayable area of display 116, including a central region of test pattern 101 most likely to affect AGC action of video camera 117. Thus, fixed level area 102 may be maintained at a constant gray level so that the average intensity level of test pattern 101 remains constant. Alternatively, the brightness of fixed level area 102 may be varied in inverse proportion to the average intensity level of dynamic test patch area 103 and grating area 104 to offset the average intensity levels thereof. Thus, small connections to the intensity of relatively large "fixed" level area 102 serves to maintain an overall fixed average intensity level of test pattern 101 as the relatively small areas 103 and 104 vary in intensity level.

Dynamic test patch area 103 and grating area 104 preferably are located off center, at a periphery of larger fixed level area 102. Again, dynamic test patch and grating areas 103 and 104 preferably constitute relatively small areas so as to minimize variations caused by any AGC devices or functions within or part of the appropriate image input device, such as video camera 117, any scan converter that may be installed in PC 115, or other related devices. Offsetting the location of dynamic test patch and grating areas 103 and 104 further minimizes AGC operation in those devices having a center-weighted automatic gain control function.

Preferably, image input device should be compatible with the output media supported by the image output device. Thus, for example, in the case of video camera 117, it should have a scan rate, shutter speed, sensitivity, etc. compatible with the dynamic range, persistence, scan rate, form factor, etc. of video display 116. In some cases, it may be necessary to adjust the scan rate of video display 116 to conform with video camera 117 or to average the output of video camera 117 over several frames to minimize, flicker or other effects tending to degrade measurement of intensity levels, i.e., pixel luminance levels in the case of a video monitor.

The dynamic test patch area 103 may include a plurality of pixels having the same pixel values, such that the resultant intensity level is substantially uniform throughout the area, as shown in more detail in the magnified view 105 of a portion of the dynamic test patch area, 103. As represented by the uniform coloring, dynamic test patch area portion 105 is evenly illuminated at a constant intensity level in response to pixel values provided by the test pattern generator routine running on PC 115. These pixel values may represent various colors or "hues" so as to calibrate a desired output device over a range of colors, e.g., red, green, and blue.

Grating area 104, shown in greater detail in magnified grating area 106 comprises at least two groupings of pixels, as shown a series of parallel lines of predetermined pixel values representing, for example, black and white. Preferably, in the case of a CRT (i.e., a horizontally scanned raster display), each grouping of pixels are horizontal lines, so as to minimize the required frequency response of the image output device required to display grating area 104. While a preferred embodiment uses two groups of pixels (i.e., alternating lines of different intensity levels, such as black and white, black and red, etc.), other combinations may be used. For example, the ratio between groupings may be varied to achieve a desired average illumination for grating area 104, or the width of each of the lines may be varied. Still further, as the calibration procedure proceeds, therefore defining the relationship between pixel values and resultant pixel intensity levels, other pixel values and intensity levels are defined may be used to define the composition of grating area 104. Thus, while initially, grating area 104 may use some combination of pure black and white lines or black and monochromatic (i.e., red, green, or blue) lines of maximum intensity (and saturation), intermediate pixel values may be utilized as the calibration procedure progresses.

Each of the dynamic test patch and grating areas are shown in further detail on the left portion of FIG. 1. In particular, dynamic test patch area 103 includes a plurality of pixels, each pixel comprising a triad of three phosphor dots including, for example, green dot 119, blue dot 107, and red dot 108 considered as a single pixel. Each of the horizontal scan lines 109 comprise a plurality of horizontally arranged pixel triads (or just "pixels"). By setting each of these pixels to a common value, a constant intensity level is obtained throughout dynamic test patch area 103. Note that, as used herein, a pixel values includes, as appropriate, values for each of its constituent color components (e.g., red, green, and blue). However, it is not necessary that each of the color components be the same; and in fact, it is expected that the calibration process would provide an appropriate mapping for each of the colors alone, and possibly in combination with the others. In general, the mapping would result in an appropriate gamma correction as would be understood by one of ordinary skill in the art.

Further detail of grating area 104 is shown in the left portion of FIG. 1. According to the present embodiment of the invention in which alternating scan lines are rendered in absolute black and white, e.g., minimum and maximum intensity levels achievable by the image output device, or in this case, display 116. Thus, pixels comprising scan lines 113 including, for example, a pixel including triad dots 119, 107, and 108, are set to some predetermined pixel values (e.g., zero) corresponding to a minimum intensity level such as black. Conversely, pixels of scan lines 114 including, for example, pixel triad dots 110, 111, and 112 constituting a single picture element are set to some high intensity level (e.g., 255) representing, for example, white. Although alternating intensity levels per scan line provides a configuration in which it is relatively easy to obtain an average intensity level for the entire grating area 104, other configurations may be employed. For example, other combinations of scan line groupings may be used or a scan line may be divided into portions throughout grating area 104 to obtain various desired overall intensity levels of the grating area. Further, as mentioned above, other pixel values may be used as they become defined.

Operationally, according to a preferred embodiment of the invention, grating area 104 initially displays scan lines of known intensity levels corresponding to pixel values for black and white. Once established, the pixel values for dynamic test pattern area 103 are varied until the average intensity level for both areas 103 and 104 are equal as detected by video camera 117. The image input device is used to measure the average luminance or reflectance of the grating area. To achieve this averaging, the grating can be rendered at a higher spatial frequency than the Nyquist sampling frequency of the input device. The frequency of the grating can be adjusted until it is sufficiently high, if the resolution of the output device allows this. Alternatively, the Nyquist frequency of the input device can be reduced. In a camera, this can be achieved by defocusing the camera or moving the camera further from the grating. In a scanner, the scanner may have an adjustable resolution, or a diffusing optical element can be placed between the sample and the scanning head. Thus, for example, if the intensity levels of dynamic test patch area 103 were found to be higher (e.g., more intense than that of grating area 104) as detected by video camera 117, the pixel values for dynamic test patch area 103 would be decreased until the intensity level of the dynamic test patch area 103 were equal to the average intensity level of grating area 104. Once this equality is achieved, a correspondence is found between the pixel value required to provide the intensity level corresponding to the average intensity level of grating area 104. During this first pass, grating area 104, having alternating black and white lines, would be considered to be 50% gray level. Thus, the pixel values required such that dynamic test patch area 103 has an average intensity level equal to the average intensity level of grating area 104 is known and may be used in subsequent creation in grating area 104. This closed loop process of using combinations of known pixel values having known intensity levels to compare a variable intensity area allows the mapping of multiple pixel values to their corresponding pixel levels. This information may then be used to create a gamma correction curve or table.

While the present invention has been described in connection with gray levels, it is equally applicable to color presentations. Further, while a preferred embodiment has been described in connection with a video display, test pattern 101 may be represented in printed form as output, for example, by printer 118. In such case, it is necessary to image the output media, e.g., paper, upon each iteration until the reflectance of dynamic test patch area 103 is substantially equal to the average reflectance of grating area 104. Because each iteration requires printing of a new page, the system may employ predetermined acceptable error margins, the achievement of which would satisfy desired match criteria. Alternatively, many test patterns may be printed on a single page. The match between the dynamic patch area 103 and the grating area 104 can be "bracketed" by printing both more and less reflective patches for area 103 and 104. By printing more patterns on a single page, the calibration will require fewer or no iterations.

Figure 2:
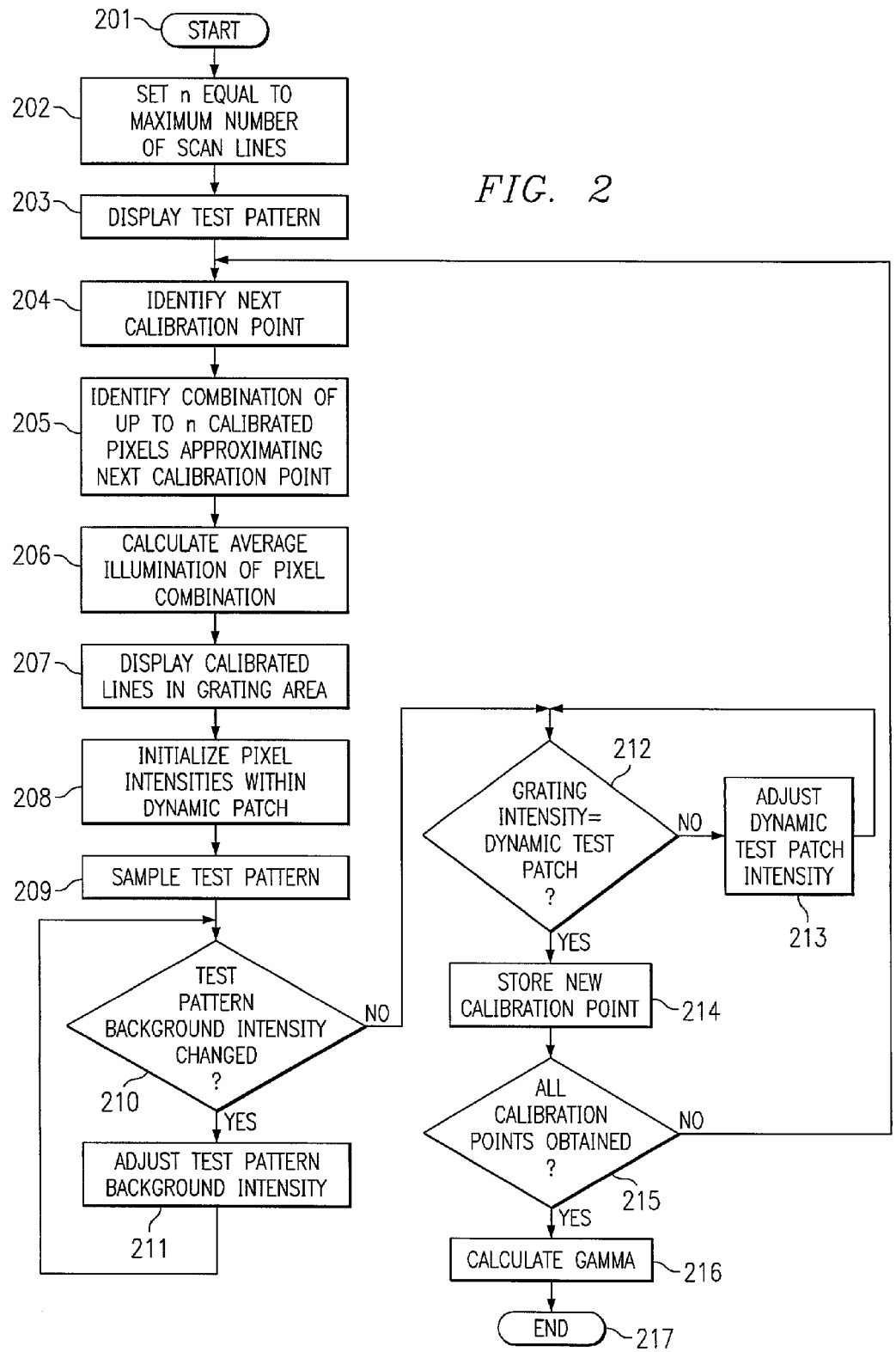
FIG. 2 is a flow diagram of a method for calibrating an output device according to the invention.

A method according to the invention is shown in the flow diagram of FIG. 2. Upon entering at step 201 flow continues at step 202 to set "n" equal to a maximum number of scan lines that may be combined to form a desired grating area 104. At step 203 a test pattern is displayed and, at step 204, the next calibration point is identified e.g., a next point on a gamma curve function is targeted. As described in the above example with reference to FIG. 1, "n" may be equal to 2 and the next calibration point may be set to 50% gray level. Thus, in this case, grating area 104 would be defined to include alternating scan lines of black and white. At step 205, combinations are identified that provide up to "n" calibrated pixels approximating the next calibration point. Again, with "n" equal to 2 according to the present example, and given that only pure black and white levels are known at this point, the step would revert to an initial case of alternating black and white lines. At step 206 a calculation is performed to determine the average illumination of the pixel combination identified in step 205. Again, using alternating black and white lines, a 50% gray intensity level would be computed. The calibrated black and white lines are then displayed in grating area 104 at step 207. At step 208, the pixel intensities within the dynamic patch area 103 are initialized and a sample of the displayed image of test pattern 101 is taken in step 209. In the case of a video monitor, this may include capturing an image of the monitor using a video camera. The test at step 210 determines if the background intensity has changed and, if so, an appropriate adjustment is made at step 211 until the background intensity matches that previously detected. This assures that any AGC action has been compensated for.

Once any necessary adjustments are made to fixed level area 102, processing continues at step 212 to determine if the grating intensity level is equal to the intensity level of the dynamic test patch area. If not, then processing continues at step 213 to adjust the dynamic test patch area intensity by varying the pixel values within the dynamic test patch area. Steps 212 and 213 are repeated until the test of step 212 is passed, such that the average intensity level of dynamic patch area 103 is equal to the known intensity level of grating area 104, as detected by video camera 117. Once the two areas have matching intensity levels, processing continues as step 214 to store the new calibration point. At step 215 a test is performed to determine if all desired calibration points have been obtained. If not, then processing continues at step 204 to identify a next calibration point. Alternatively, if all desired calibration points have been obtained, then processing continues at step 216 to calibrate the gamma in a form of a table, curve or other format mapping intensity levels for the output device to corresponding pixel values, and then ends at step 217.

What is claimed is:

1. An apparatus for calibrating an image output device, comprising:
   a test pattern generator for generating a test pattern including a dynamic test patch area and a grating area, the test pattern supplied to the image output device, which outputs the test pattern; and
   an image input device for creating an image of the outputted test pattern and inputting the image created by the image input device into the test pattern generator,
   the test pattern generator using the image created by the image input device to adjust an intensity level of said dynamic test patch area to match an average intensity level of said grating area in the test pattern.

2. The appamus of claim 1 wherein said test pattern further includes a fixed level area.

3. The apparatus of claim 1 wherein said test pattern generator sets said intensity level of said grating area and adjusts said intensity level of said dynamic test patch area by setting pixel values of said grating area and said dynamic test patch areas.

4. The apparatus of claim 1 wherein said dynamic test patch area comprises a plurality of pixels of substantially equd intensity levels and said grating area comprises at least two groups of pixels, each group having a different, predetermined intensity level.

5. The apparatus of claim 4 wherein each of said two groups of pixels of said grating area arc set to respective predetermined pixel values associated with said predetermined intensity levels.

6. The apparatus of claim 1 wherein said dynamic test patch area comprises an area of uniform pixel value and said grating area comprises a plurality of lines of pixels, a number of said lines of pixels having a first value and a second number of said lines of pixels having a second value different from said first value.

7. The apparatus of claim 6 wherein said test pattern generator is configured to control said uniform pixel value of said dynamic test patch area to adjust said intensity level of said dynamic test patch to be equal to said average intensity level of said grating area.

8. The apparatus of claim 1 wherein said test pattern generator is operable to associate a plurality of pixel values with corresponding pixel intensities, said grating area comprising pixels having a combination of at least two of said plurality of pixel values.

9. The apparatus of claim 8 wherein said combination of at least two of said plurality of pixel values results in a new average intensity level of said grating area whereby said test pattern generator is configured to adjust pixel values of said dynamic test patch area to approximate said new average intensify level.

10. The apparatus of claim 1 wherein said test pattern generator is operable to adjust said level of said dynamic test patch area to match a plurality of predetermined average intensity levels of said grating area.

11. The apparatus of claim 10 further comprising a gamma corrector responsive to said test pattern generator to map a plurality of pixel values to corresponding pixel intensity levels.

12. The apparatus of claim 1 wherein said image output device includes a video monitor and said image input device comprises a video camera.

13. The apparatus of claim 1 wherein said test pattern generator can adjust an intensity level of said fixed level area to maintain a predetermined average intensity level of the output device.

14. The apparatus of claim 1 wherein said test pattern generator additionally has an output of a fixed level area and said dynamic test patch, grating and fixed level areas comprise areas displayed on a video display, said dynamic test patch and grating areas comprising areas of said video display substantially smaller than and located at a periphery of said fixed level area.

15. The apparatus of claim 1 wherein said image output device includes a printer and said image input device comprises an optical scanning device.

16. The apparatus of claim 1 wherein said lest pattern additionally has an output affixed level area and said dynamic test patch, grating and fixed level areas comprise areas printed on a medium, said dynamic test patch and grating areas comprising printed areas of said medium substantially smaller than and located at a periphery of said fixed level area.

17. A method of calibrating an output of an image output device, comprising:
generating a test pattern including a grating area and a dynamic test patch area;
setting a configuration of pixels within said grating area to first and second predetermined pixel levels;
outputting the test pattern;
creating an image of the outputted test pattern with an image input device after the outputted test pattern is generated;
inputting the image of the outputted test pattern into the test pattern generator; and
adjusting a value of pixels within said dynamic test patch area to match an intensity level of said dynamic test patch area to an average intensity level of said grating area.

18. The method of claim 17 wherein generating a test pattern further includes generating a fixed level area, said grating area and dynamic test patch area comprising smaller areas than, and embedded in, said fixed level area.

19. The method of claim 17 further comprising repeating setting and adjusting to provide a gamma correction value.

20. The method of claim 17 wherein adjusting a value of pixels includes measuring an avenge pixel illumination level of said grating area and a pixel illumination level of said dynamic test patch area.

21. The method of claim 17 wherein generating a test pattern includes supplying a video signal to a video display.

22. An apparatus for calibrating an output of an image output device comprising:
detector means for imaging the output of the image output device and inputting the image of the output of the image output device to a test pattern generator; and
test pattern generator means for providing a test pattern to said image output device, the test pattern including dynamic test patch, grating and fixed level areas, said test pattern generator means responsive to said detector means for adjusting an intensity level of said dynamic test patch area to match an average intensity level of said grating area.

* * * * *

UNITED STATES PATENT AND TRADEMARK OFFICE
CERTIFICATE OF CORRECTION

PATENT NO. : 7,133,148 B2  Page 1 of 1
APPLICATION NO. : 10/057586
DATED : November 7, 2006
INVENTOR(S) : D. Amnon Silverstein It is certified that error appears in the above-identified patent and that said Letters Patent is hereby corrected as shown below:

In column 6, line 59, in Claim 2, delete "appamus" and insert -- apparatus --, therefor.

In column 7, line 1, in Claim 4, delete "equd" and insert -- equal --, therefor.

In column 7, line 5, in Claim 5, delete "arc" and insert -- are --, therefor.

In column 8, line 1, in Claim 16, delete "lest" and insert -- test --, therefor.

In column 8, line 2, in Claim 16, delete "affixed" and insert -- of fixed --, therefor.

In column 8, line 35, in Claim 20, delete "avenge" and insert -- average --, therefor.

Signed and Sealed this

Twenty-ninth Day of September, 2009

David J. Kappos
*Director of the United States Patent and Trademark Office*